United States Patent [19]

Chesler

[11] Patent Number: 5,193,756
[45] Date of Patent: Mar. 16, 1993

[54] FIGURE EIGHT LINEAR DISPENSER

[75] Inventor: Ronald B. Chesler, Woodland Hills, Calif.

[73] Assignee: Hughes Aircraft Company, Los Angeles, Calif.

[21] Appl. No.: 720,057

[22] Filed: Jun. 24, 1991

[51] Int. Cl.$^5$ .................... B65H 75/02; B65H 55/00
[52] U.S. Cl. .................................. 242/54 R; 242/47; 242/129; 242/159; 242/170
[58] Field of Search ................... 242/54 R, 82, 83, 47, 242/159, 170, 171, 129, 128, 129.5, 141, 146; 28/289

[56] References Cited

U.S. PATENT DOCUMENTS

| | | | |
|---|---|---|---|
| 3,389,868 | 6/1968 | Majkrzak | 242/54 R |
| 4,408,378 | 10/1983 | Ketteringham et al. | 242/47 X |
| 4,657,165 | 4/1987 | Giroux | |
| 4,840,449 | 6/1989 | Ghanderharizadeh | |
| 4,932,744 | 6/1990 | Messelhi | |

FOREIGN PATENT DOCUMENTS

| | | | |
|---|---|---|---|
| 3022088 | 12/1981 | Fed. Rep. of Germany | 28/289 |
| 8600821 | 2/1987 | Netherlands | |
| 153078 | 5/1962 | U.S.S.R. | 242/47 |
| 2081764 | 2/1982 | United Kingdom | 242/47 |

Primary Examiner—Stanley N. Gilreath
Attorney, Agent, or Firm—C. D. Brown; R. M. Heald; W. K. Denson-Low

[57] ABSTRACT

A figure eight linear dispenser (10) having an optical fiber winding configuration adapted to dispense an optical fiber waveguide (14) at high speed. The dispenser (10) is built up of a series of flat winding layers, with each layer comprising an interlaced figure eight pattern. More particularly, the dispenser (10) comprises a housing having a pair of bobbins (12a, 12b) respectively centered on a pair of half-circular outer guides (13a, 13b). The optical fiber waveguide (14) is wound around the bobbins (12a, 12b) inside the outer guides (13a, 13b) in a series of layers (15a-15e) of figure eight loops (16a-16e). An optional cover may be disposed over the bobbins (12a, 12b) and the guides (13a, 13b) in order to enclose the waveguide (14). The waveguide pay-out of the dispenser (10) through a properly spaced eyelet (17) is nearly helix-free and linear as a result of cancellation of the angular momentum in the paired figure eight loops (16a-16e). The dispenser (10) permits linear (helix-free) payout at higher speeds than other types of linear dispensers. This is accomplished by a reduction in the waveguide tension for a given payout velocity. The dispenser (10) increases the applicability of fiber tethered links to a wider range of high performance missiles and vehicles because of its increased payout speed and linear payout capability. Linear payout allows ducting of the paid out fiber to avoid a direct thrust missile plume. The dispenser also uses a relative small exit aperture or eyelet (17) for the fiber waveguide (14) which reduces aerodynamic drag and radar cross section of the carrying vehicle.

2 Claims, 2 Drawing Sheets

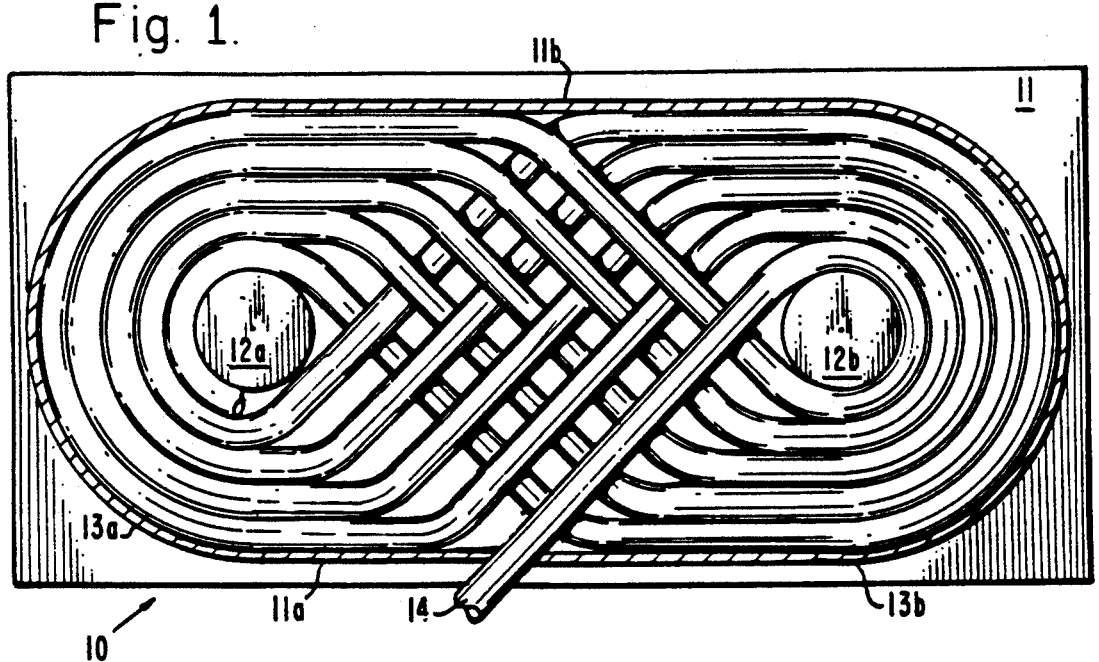
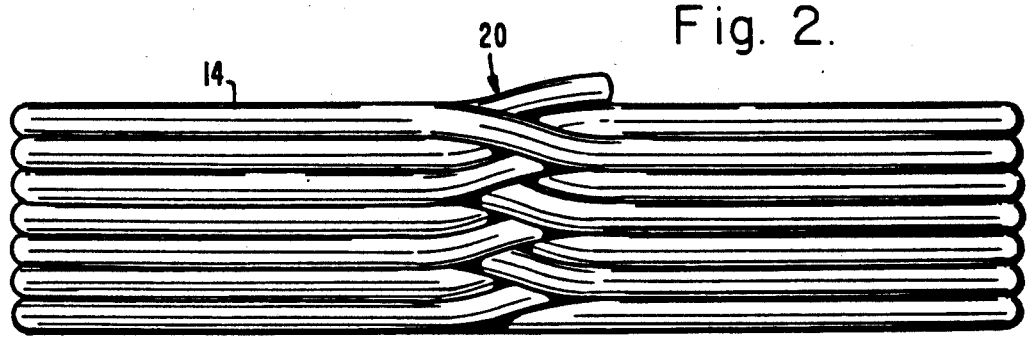
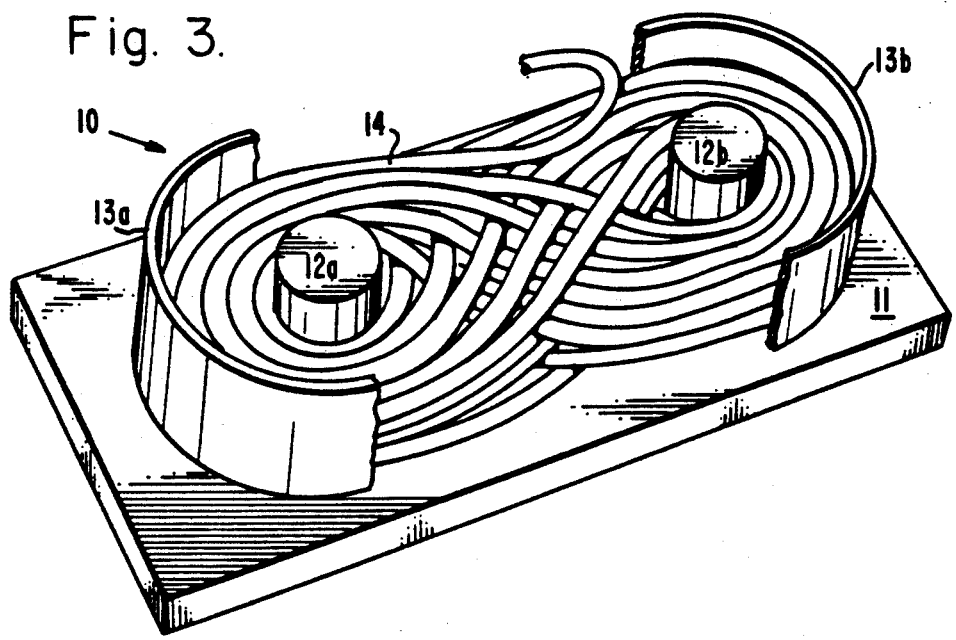

FIGURE EIGHT LINEAR DISPENSER

BACKGROUND

The present invention relates generally to optical fiber dispensers for use with wire-guided missiles, and more particularly, to a figure eight optical fiber dispenser having linear payout capability and that is operable at relatively high speeds.

A conventional fiber dispenser produces an anchor point fiber tension of approximately $(3/2)RV^2$, where R is the fiber mass per unit length and V is the payout velocity. One third of the above tension arises from the damping of the helix in air subsequent to payout. Because the tension increases as the square of the payout speed, it tends to determine the upper payout speed limit for a given fiber strength. Optical fiber strength, in turn, is limited and expensive to increase. A balloon assisted type linear dispenser has a theoretical tension value of approximately $2RV^2$ due to mechanical friction used to damp the helix. In practice, balloon assisted dispensers have produced even higher tension than this. An aerosol linear dispenser has a minimum theoretical tension of $(3/2)RV^2$, similar to the ordinary dispenser.

Accordingly, it would be an improvement in the art to provide for an optical fiber dispenser that has a lower tension value, that provides for linear payout capability, and that is operable at relatively high speeds.

SUMMARY OF THE INVENTION

The present invention is a figure eight linear dispenser having an optical fiber winding configuration adapted to dispense an optical fiber at high speed. It is built up of a series of flat, or "pancake," winding layers, with each layer comprising an interlaced figure eight pattern. Payout occurs through an eyelet positioned at a distance to include approximately one complete figure eight length of fiber between the eyelet and the fiber pack. The advantage of the figure eight linear dispenser is that the waveguide payout therefrom is nearly helix-free and linear as a result of cancellation of the angular momentum in paired figure eight loops.

The figure eight linear dispenser permits linear (helix-free) payout at higher speeds than other types of linear dispensers. This is accomplished by a reduction in the fiber tension for a given payout velocity. The figure eight linear dispenser has a theoretical tension of only $RV^2$ because no dissipation of rotary energy is required. For a given tension then V can be 22% higher than even an ordinary helix-producing dispenser or an aerosol damped dispenser, and 41% higher than a balloon assisted dispenser performing at its theoretical best. In addition, the potential reliability problems relating to fiber damage during dispense that are concerns with the balloon assisted dispenser are eliminated with the figure eight linear dispenser of the present invention.

The figure eight linear dispenser increases the applicability of fiber tethered links to a wider range of high performance missiles and vehicles because of its increased payout speed capability and its linear payout capability. Linear payout allows ducting of the paid out fiber to avoid a direct thrust missile plume. It also allows a small exit aperture of the fiber which reduces aerodynamic drag and radar cross section of the carrying vehicle.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a top view of a figure eight linear dispenser in accordance with the principles of the present invention;

FIG. 2 shows a side view of the interleaved windings of the dispenser of FIG. 1;

FIG. 3 shows a perspective view of the figure eight dispenser of FIG. 1; and

DETAILED DESCRIPTION

Figure 4:
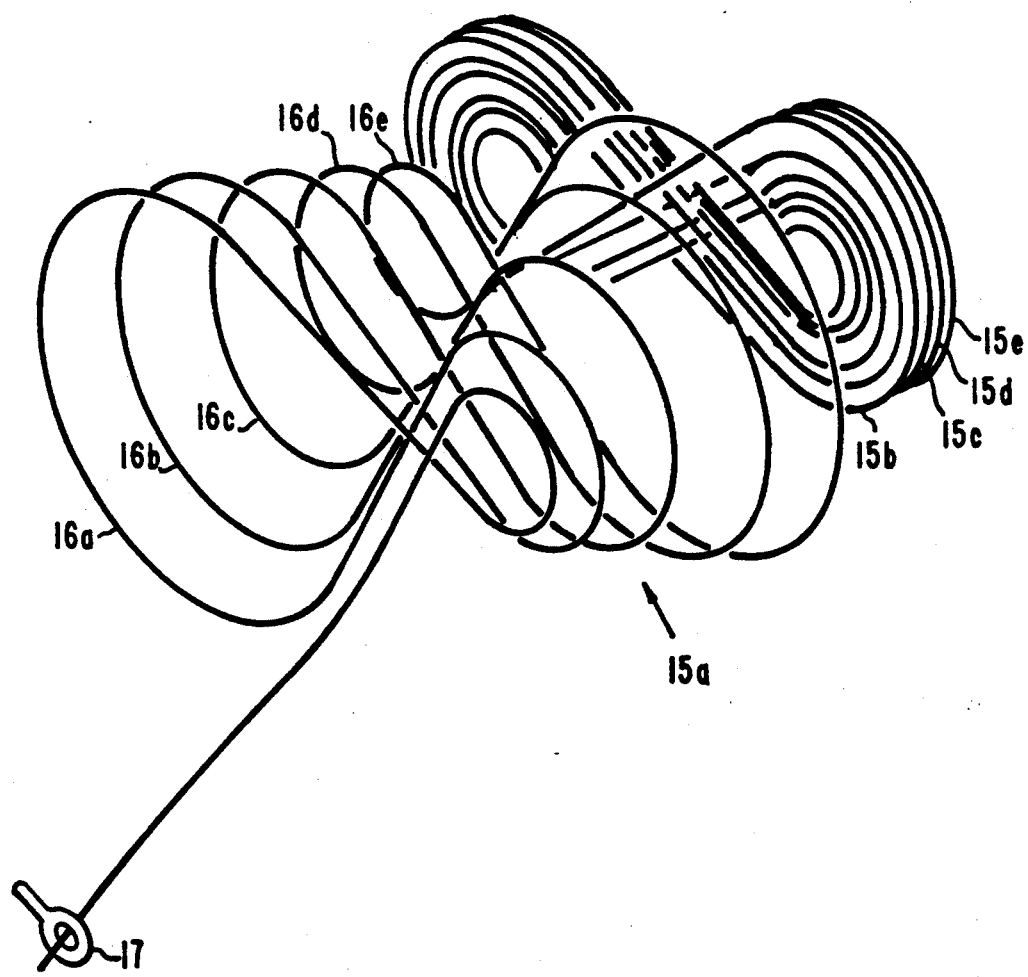
FIG. 4 shows an exploded view of the windings of the dispenser of FIG. 1.

Referring to the drawing figures, a top view of a figure eight linear dispenser 10 in accordance with the principles of the present invention is shown in FIG. 1. The figure eight linear dispenser 10 comprises an enclosure or housing having a base 11 and a pair of lateral sidewalls 11a, 11b. Disposed in the housing is a pair of bobbins 12a, 12b respectively centered on a pair of half-circular outer guides 13a, 13b comprising the ends of the housing. An optical fiber waveguide 14 is wound around the bobbins 12a, 12b inside the outer guides 13a, 13b in a series of layers 15a–15e of figure eight loops 16a–16e, shown more clearly in an exploded fashion in FIG. 4. As shown in FIGS. 1 and 4, there are five layers 15a–15e, each comprising five figure eight loops 16a–16e. An optional cover (not shown) may be disposed over the bobbins 12a, 12b and the outer guides 13a, 13b in order to enclose the optical fiber waveguide 14.

An exit aperture or eyelet 17 may be disposed above the dispenser 10 (see FIG. 4) through which the waveguide 14 is passed prior to its connection to a vehicle, for example. Although not shown in the drawing figures, the eyelet 17 is connected to the housing or to some other available portion of the dispenser 10 in a conventional manner. The distance (d) between the stacked series of layers 15a–15e of the waveguide 14 (known as a fiber pack) and the exit eyelet 17 is such that it allows approximately one entire figure eight loop to be contained in the space therebetween, when the loop 16a is in a "payed out" state. Hence, the eyelet 17 permits a completely linear payout of the waveguide 14 by the dispenser 10. Thus, the angular momentum from each half of a figure eight loop 16a, for example, cancels out, thus producing a linear payout.

For the purposes of testing the operation of the present invention, the figure eight linear dispenser 10 was loaded with ⅛ inch nylon line as a substitute for the optical fiber waveguide 14 which was wound around the two bobbins 12a, 12b and inside the two outer half-circular guides 13a, 13b. The separation between the centers of the two bobbins 12a, 12b is about 20% greater than it would be for two circular optical fiber waveguide windings with the same number of layers at contact distance. The figure eight linear dispenser 10 was demonstrated with five nylon line layers with each layer comprising five figure eight loops.

The figure eight linear dispenser 10 demonstrates nesting of the turns of successive layers 15a–15e of the waveguide 14 in a "braided" crossover section 20 between the bobbins 12a, 12b shown in FIG. 2. More particularly, FIG. 2 shows a side view of the interleaved windings of the waveguide 14 of the dispenser 10 of FIG. 1. In this crossover section 20, the winding of the figure eight linear dispenser 10 for each layer 15a-15e is two fibers thick. However, each of the two layers shares half its space with fibers from the layers on either side of it. As a result, the average layer thickness is equal to the thickness of a single optical fiber waveguide throughout. The figure eight linear dispenser 10 provides for nesting that has substantially no "bulge" in the crossover section 20, aside from the one additional optical fiber waveguide thickness, which is a constant and does not increase for large windings.

With reference to FIG. 3, it shows a perspective view of the figure eight dispenser of FIG. 1 with the sidewalls 11a, 11b removed. This shows the nesting of the figure eight loops 16a-16e. The eyelet 17 (although not shown in FIG. 3) is disposed above the dispenser the distance d above the waveguide 14 above a position midway between the two bobbins 12a, 12b.

Linear payout results from opposite angular momentum created by successive half loops of the figure eight loops 16a-16e. Since the successive half loops are not exactly equal in diameter, (the outside of one loop 16a is paired with the inside turn on the other loop 16b in the extreme case) the match is not exact but the maximum residual rotary helix energy is reduced by the ratio of the winding thickness squared divided by the average winding diameter squared. For a 10% thickness optical fiber waveguide winding, for example, the residual energy is at most 1% of the helix energy of a conventional dispenser.

The figure eight linear dispenser 10 functions with or without an enclosing container or cover and with the relatively small exit aperture or eyelet 17 provided for the fiber waveguide 14 exit. However, linear payout is achieved only when a properly located eyelet 17 is included. With an enclosing cover, the space inside the dispenser 10 should be made long enough to allow momentum cancellation between two figure eight half loops. This makes the envelope of the figure eight linear dispenser 10 similar in size to a conventional balloon assisted dispenser or an aerosol damped dispenser. Without and enclosing cover, the figure eight linear dispenser 10 occupies a slightly larger volume than a conventional dispenser, since there is some space not filled with the optical fiber waveguide 14 between the respective bobbins 12a, 12b and the crossover section 20. The overall volumetric efficiency is generally similar to other common types of dispenser windings.

The dispenser 10 may be conformally shaped to permit its use in applications such as a "strap-on" dispenser for the exterior of a vehicle. In particular, the winding of the optical fiber waveguide 14 used in the dispenser 10 may be more elongated along the line joining the two bobbins 12a, 12b, the bobbins 12a, 12b may be noncircular, or the overall shape of the figure eight linear dispenser 10 may be curved, if desired. The figure eight dispenser 10 of the present invention is also well adapted for use with reinforced sections of fiber or "leaders" which are then used at the initiation of "launch" of the payout vehicle.

Thus there has been described a new and improved a figure eight dispenser having linear payout capability and that is operable at relatively high speeds. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An optical fiber dispenser comprising:
a pair of bobbins having parallel longitudinal axes and separated from each other by a predetermined distance;
a housing comprising a pair of curved guides disposed distally from each other generally along a line drawn through the bobbins, each guide having a radius of curvature that is substantially centered on a respective bobbin;
an optical fiber waveguide having a plurality of relatively flat winding layers successively stacked on top of each other, each layer comprising an interlaced figure eight winding pattern, and wherein the optical fiber waveguide is wound around the pair of bobbins and inside the pair of half-circular guides to achieve the figure eight winding pattern said figure eight winding pattern having a crossover section with the crossover section of one winding layer nested within the crossover section of an adjacent winding layer.

2. The optical fiber dispenser of claim 1 wherein the separation between the centers of the two bobbins is about 20% greater than twice the radius of curvature of a curved guide.

* * * * *